(12) United States Patent
MacDougall et al.

(10) Patent No.: US 8,689,867 B2
(45) Date of Patent: Apr. 8, 2014

(54) METHOD AND APPARATUS FOR PIPE-CONVEYED WELL LOGGING

(75) Inventors: Tom MacDougall, Sugar Land, TX (US); Harold S. Bissonnette, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 548 days.

(21) Appl. No.: 12/543,606

(22) Filed: Aug. 19, 2009

(65) Prior Publication Data

US 2011/0042079 A1   Feb. 24, 2011

(51) Int. Cl.
*E21B 47/01*   (2012.01)
*E21B 47/09*   (2012.01)

(52) U.S. Cl.
USPC ..... 166/254.2; 166/66; 166/242.6; 166/255.1

(58) Field of Classification Search
USPC .......... 166/254.2, 255.1, 382, 66, 237, 242.6; 175/40, 45, 50; 73/152.01, 152.02, 73/152.51
See application file for complete search history.

(56) References Cited

U.S. PATENT DOCUMENTS

| | | | |
|---|---|---|---|
| 4,041,780 A | 8/1977 | Angehrn | |
| 4,457,370 A | 7/1984 | Wittrisch | |
| 4,550,392 A * | 10/1985 | Mumby | 367/82 |
| 4,597,440 A | 7/1986 | Pottier | |
| 4,715,446 A * | 12/1987 | Wittrisch | 166/381 |
| 4,856,595 A | 8/1989 | Upchurch | |
| 5,186,048 A * | 2/1993 | Foster et al. | 73/152.02 |
| 5,217,075 A * | 6/1993 | Wittrisch | 166/302 |
| 5,244,050 A | 9/1993 | Estes | |
| 5,278,550 A * | 1/1994 | Rhein-Knudsen et al. | 340/855.1 |
| 5,433,276 A | 7/1995 | Martain et al. | |
| 5,521,592 A | 5/1996 | Veneruso | |
| 6,269,891 B1 | 8/2001 | Runia | |
| 6,419,013 B1 * | 7/2002 | Milne et al. | 166/254.2 |
| 6,578,631 B2 | 6/2003 | Milne et al. | |
| 6,641,434 B2 | 11/2003 | Boyle et al. | |
| 6,755,257 B2 | 6/2004 | Spencer et al. | |
| 7,134,493 B2 | 11/2006 | Runia | |
| 7,337,850 B2 * | 3/2008 | Contant | 166/375 |
| 7,549,471 B2 * | 6/2009 | Aivalis et al. | 166/254.2 |
| 7,640,979 B2 * | 1/2010 | Watson et al. | 166/254.2 |
| 7,661,475 B2 * | 2/2010 | Sheiretov et al. | 166/254.2 |
| 7,874,359 B2 * | 1/2011 | Bissonnette et al. | 166/254.2 |
| 7,896,074 B2 * | 3/2011 | Bissonnette et al. | 166/254.2 |
| 7,905,282 B2 * | 3/2011 | Bissonnette et al. | 166/254.2 |
| 2002/0117300 A1 * | 8/2002 | Spencer et al. | 166/254.2 |
| 2003/0218547 A1 * | 11/2003 | Smits et al. | 340/853.9 |
| 2004/0074639 A1 * | 4/2004 | Runia | 166/254.2 |
| 2004/0118611 A1 | 6/2004 | Runia et al. | |
| 2004/0238218 A1 | 12/2004 | Runia et al. | |
| 2005/0029017 A1 | 2/2005 | Berkheimer et al. | |
| 2006/0225926 A1 | 10/2006 | Madhavan et al. | |
| 2007/0284116 A1 * | 12/2007 | Hall et al. | 166/385 |

(Continued)

*Primary Examiner* — Jennifer H Gay

(74) *Attorney, Agent, or Firm* — Trevor Grove; John Vereb; Jody Lynn DeStefanis

(57) ABSTRACT

A well logging instrument deployment device according to this aspect of the invention includes a housing configured to be coupled to a pipe string. A latch disposed in the housing and is configured to retain a well logging instrument in a first longitudinal position inside the pipe string. An actuator is configured to release the latch to enable longitudinal movement of the well logging instrument inside the pipe string. A signal detector is operatively coupled to the actuator and is the configured to detect a command signal for operating the actuator.

16 Claims, 6 Drawing Sheets

(56) References Cited

U.S. PATENT DOCUMENTS

| | | | |
|---|---|---|---|
| 2007/0295502 A1* | 12/2007 | Watson et al. | 166/254.2 |
| 2008/0159077 A1* | 7/2008 | Madhavan et al. | 367/76 |
| 2008/0173481 A1* | 7/2008 | Menezes et al. | 175/40 |
| 2008/0202767 A1* | 8/2008 | Sheiretov et al. | 166/381 |
| 2009/0194270 A1* | 8/2009 | Bissonnette et al. | 166/65.1 |
| 2009/0194271 A1* | 8/2009 | Bissonnette et al. | 166/66 |
| 2010/0096187 A1* | 4/2010 | Storm et al. | 175/50 |
| 2011/0042079 A1* | 2/2011 | MacDougall et al. | 166/254.2 |

* cited by examiner

METHOD AND APPARATUS FOR PIPE-CONVEYED WELL LOGGING

BACKGROUND OF THE INVENTION

1. Field of the Invention

The invention relates generally to the field of well logging conveyance. More specifically, the invention relates to methods and devices for conveying well logging instruments through a wellbore.

2. Background Art

Electric wireline wellbore logging instruments are used for, among other things, making measurements of various physical properties of earth formations penetrated by wellbores. Electric wireline logging instruments are typically inserted into the wellbore by the force of gravity while connected to the end of an armored electrical cable, and are returned to the earth's surface by retracting the cable. For example, the cable is typically retracted by a winch or similar spooling apparatus. The cable provides electrical power to the instruments to operate the various sensors and related devices therein and provides signal communication path(s) between the various sensors and related devices and a recording unit disposed at the Earth's surface.

Certain wellbores are drilled so as to have significant inclination from vertical over at least a portion of the wellbore. Other wellbores can have a section which is substantially horizontal. Still other wellbores may be drilled through formations that are subject to swelling or caving, or having fluid pressures therein that make passage of well logging instruments past them that are unsuitable for typical well logging instrument conveyance techniques. Gravity cannot be practicably used to insert well logging instruments into these wellbores, so various methods have been devised to insert well logging instruments into such wellbores.

One of the methods known in the art for inserting well logging instruments into highly inclined or horizontal wellbores is to attach the well logging instruments to the end of a pipe comprising threaded sections ("drill pipe" or "tubing"), and to lower the pipe into the wellbore by threadedly attaching additional sections to the pipe at the upper end thereof. After the well logging instruments are inserted to a desired depth in the wellbore, an electrical cable may be attached to the upper end of the well logging instruments, typically by pumping the cable through the center of the pipe until the cable latches onto a special electrical and mechanical connector disposed at the top of the well logging instruments. The cable can be inserted into the center of the pipe from the outside of the pipe through a device called a "side entry sub." A side entry sub is a short section of pipe having a sealable opening through a side wall of the section of pipe, which enables passage of the cable through the wall of the pipe section. The side entry sub is typically assembled to the pipe at a substantial distance below the upper end of the pipe. Assembled in this position, the side entry sub enables raising the well logging instruments within the wellbore (or withdrawing them from the wellbore) by removing sections from the pipe simultaneously with spooling of the cable as the logging instruments are raised in or withdrawn from the wellbore. By such procedure, portions of the wellbore can be measured with the well logging instrument without repeated insertion and removal of the cable from the inside of the pipe.

A drawback to using pipe to convey the well logging instruments using procedures known in the art is the presence of the cable outside the pipe from the position of the side entry sub up to the earth's surface. In some cases control of fluids which may be present in the wellbore requires using equipment located at the earth's surface designed to seal an annular space between the pipe and the wellbore. In other cases it is necessary to maintain fluid pressure on the wellbore from the earth's surface in order to obtain valid measurements from the instruments disposed in the wellbore. Cable disposed outside the pipe disturbs the operation of the sealing equipment and makes it difficult to seal the wellbore for maintaining fluid pressure.

Well logging instruments are also known in the art to be inserted into the wellbore by using a coiled tubing having a coaxially inserted electrical cable. Because the cable is coaxially inserted through the coiled tubing, it is possible to seal the annular space between the wellbore and the coiled tubing with equipment similar to that used to seal the annular space outside the sectioned pipe.

U.S. Pat. No. 5,433,276 issued to Martain et al. described a method and apparatus for inserting electric wireline logging instruments into a wellbore using an apparatus comprising pipe assembled from sections and coiled tubing having a coaxially inserted armored electrical cable ("wireline"). The method includes the steps of attaching a first part of a submersible electrical connector to one end of the coiled tubing and to the wireline inside the coiled tubing. A second part of the submersible connector is attached to one end of the wireline tools. A first part of a selectively operable latching mechanism is attached to the same end of the wireline logging instruments. A second part of the latching mechanism forms part of a latching sub which is attached to one end of the pipe. The well logging instruments are attached to the pipe by engaging the first and second parts of the latching mechanism, and the instruments are inserted into the wellbore to a predetermined depth by assembling the sections of the pipe. The coiled tubing is then inserted into the interior of the pipe until the submersible connector is engaged. The latching mechanism is selectively operated to release the well logging instruments from the sub, and the coiled tubing is inserted further into the wellbore until the well logging instruments reach a desired depth. The coiled tubing is then withdrawn until the instruments engage the sub. The latching mechanism is then selectively operated so that the well logging instruments are attached to the sub. The coiled tubing is then withdrawn from the pipe, which disengages the submersible connector. The well logging instruments are then withdrawn from the wellbore by disassembling the sections of the pipe.

U.S. Pat. No. 4,041,780 issued to Angehrn describes a self-contained, battery powered well logging instrument that can be pumped down the interior of a drill pipe string having a catcher sub at its lower end. When the well logging instrument latches into the catcher sub, the pumped fluid circulation is blocked, after which increased pump pressure switches a valve assembly to recreate circulation and energize the well logging instrument to a "standby" position. An accelerometer in the well logging instrument detects the upward movement of the well logging instrument and switches the circuitry from standby to a "record" mode. The output from a clock controlled by the downhole accelerometer is recorded along with the logging information (measurements of formation properties) measured by sensors on the well logging instrument and is synchronized with pipe footage measurements and with a similar such accelerometer and clock at the Earth's surface which are responsive to the movement of the pipe string at the Earth's surface. The recorded logging measurements are thus related to wellbore depth by correlating with the data simultaneously recorded at the Earth's surface. As an alternative embodiment, the well logging instrument is attached to the drill pipe prior to running the pipe into the wellbore.

U.S. Pat. No. 4,597,440 issued to Pottier and assigned to the assignee of the present invention describes a method for displacing a well logging instrument through a non-gravity descent portion of a wellbore such as a highly deviated portion. The disclosed method includes assembling a well logging instrument at the lower end of a drill pipe as an exposed extension to the drill pipe, displacing the well logging instrument thus exposed through the portion of the wellbore by connecting additional sections of drill pipe and lowering the drill pipe, and, during this displacing, continuously generating and sending uphole a signal indicative of the compressive load undergone by the well logging instrument.

U.S. Pat. No. 4,457,370 issued to Wittrisch describes a method for performing well logging or well servicing operations in a predetermined inclined or horizontal zone of a well following an initial vertical portion thereof. The method includes fastening a logging instrument or well servicing tool body at the end of a string of rods (such as drill pipe) lowered into the wellbore. The tool body includes an electrical connector. The method includes lowering, at the end of an electrical cable, from the Earth's surface, a mating connector adapted to fit the connector on the wellbore tool. Coupling the connectors is performed by the action of a force generated at least partly by the pressure of a fluid pumped through the pipe string, and supplying electric power through the cable and the joined connectors to the well logging or servicing tool for its operation in the predetermined zone.

U.S. Pat. No. 6,578,631 issued to Milne et al. describes a method of well logging in which the well logging instrument is delivered to the bottom of the well within a drill pipe and then the well is logged by withdrawing the drill pipe with the sensor portion of the well logging instrument protruding from the drill pipe. Following the logging operation, the well logging instrument is returned to the surface by reverse circulation.

U.S. Pat. No. 6,755,257 issued to Spencer et al. describes an apparatus and method for deploying a compact battery/memory well logging instrument for acquiring data in deviated or horizontal wellbores. A drill pipe assembly includes a drill pipe having secured at a downhole end thereof a delatching latching sub. The delatching sub contains an extendable running sub supporting a battery/memory logging instrument. The running sub occupies an initial retracted position during deployment of the drill pipe, whereby well the logging instrument is protected within one or more drill pipe stands. The running sub is movable by a messenger to a second, extended position in which its logging instrument protrudes from the end of the drill pipe. The drill pipe assembly may therefore be used to protect the well logging instrument during running in operations; and then the logging instrument is extended out the end of the drill pipe for commencement of logging operations.

U.S. Pat. No. 6,269,891 issued to Runia discloses a system for drilling and logging of a wellbore drilled through subsurface formations. The system includes a well logging instrument string and a drill string having a longitudinal channel for circulation of drilling fluid. The drill string includes a port providing fluid communication between the channel and the exterior of the drill string. The channel and the port are arranged to allow the well logging instrument string to pass through the channel and from the channel through the port to a position exterior to the drill string. The system further includes a removable closure element adapted to selectively close the port, wherein the logging instrument string may be selectively connected to the closure element.

U.S. Patent Application Publication No. 2004/0118611 filed by Runia discloses a method of drilling a wellbore into subsurface formations is-provided, including using a drill string which includes at its lower end a bottom hole assembly comprising a drill bit, a drill steering system, and a surveying system, wherein the drill string includes a passageway for an auxiliary tool to move from a first position interior of the drill string above the bottom hole assembly to a second position, wherein at least part of the auxiliary tool is exterior to the drill string below the bottom hole assembly. The passageway can be selectively closed. The method also includes drilling so as to progress the drill string into the formations until a tool operating condition is met; opening the passageway; passing an auxiliary tool from the first position through the passageway to the second position, and operating the auxiliary tool at the second position.

U.S. Pat. No. 7,134,493 issued to Runia discloses a well logging system that may be used in a wellbore. A tubular conduit extends from the Earth's surface into the wellbore and contains a body of wellbore fluid. A well logging instrument string may be passed from a position within the conduit to a position outside the conduit at a lower end part thereof, and may be suspended by the conduit in the position outside the conduit. A pressure pulse device is arranged within the conduit in a manner that the pressure pulse device is in data communication with the well logging instrument string. The pressure pulse device is capable of generating pressure pulses in the body of wellbore fluid, which pressure pulses represent data communicated by the well logging instrument string to the pressure pulse device during logging of earth formation by the well logging instrument string. The system further includes a control system in fluid communication with the body of wellbore fluid and arranged to receive the pressure pulses.

U.S. Patent Application Publication No. 2004/0238218 filed by Runia et al. discloses a method and system for introducing a fluid into a borehole, in which there is arranged a tubular drill string including a drill bit. The drill bit is provided with a passageway between the interior of the drill string and the borehole, and with a removable closure element for selectively closing the passageway in a closing position. There is further provided a fluid injection tool comprising a tool inlet and a tool outlet. A method disclosed in the '218 publication includes passing the fluid injection tool through the drill string to the closure element, and using it to remove the closure element from the closing position; passing the fluid injection tool outlet through the passageway, and introducing the fluid into the borehole from the interior of the drill string through fluid injection tool into the borehole.

There continues to be a need for well logging instrument conveyance methods and apparatus that reduce the risk of damage to the well logging instruments and increase the reliability of moving the logging instruments into and out of wellbores where wellbore conditions make instrument conveyance difficult and risky.

SUMMARY OF THE INVENTION

One aspect of the invention is a well logging instrument deployment device. A well logging instrument deployment device according to this aspect of the invention includes a housing configured to be coupled to a pipe string. A latch disposed in the housing and is configured to retain a well logging instrument in a first longitudinal position inside the pipe string. An actuator is configured to release the latch to enable longitudinal movement of the well logging instrument inside the pipe string. A signal detector is operatively coupled to the actuator and is the configured to detect a command signal for operating the actuator.

A method for well logging according to another aspect of the invention includes coupling a well logging instrument into a conveyance device and coupling the conveyance device to a pipe string. The pipe string is inserted into a wellbore. A signal may be transmitted to the conveyance device to release the well logging instrument from the conveyance device. The well logging instrument may be moved longitudinally inside the pipe string.

Other aspects and advantages of the invention will be apparent from the following description and the appended claims.

DETAILED DESCRIPTION

Figure 1:
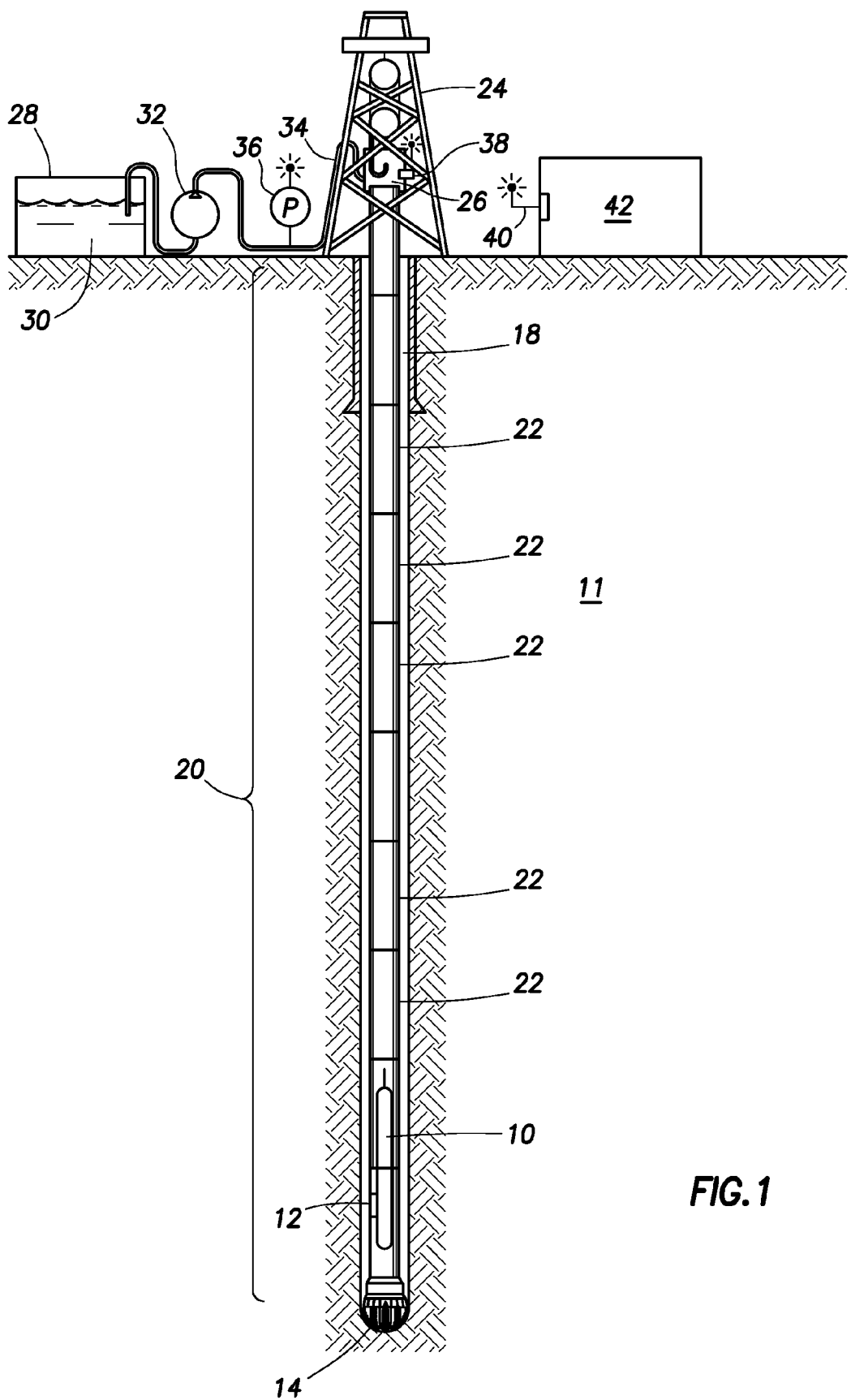
FIG. 1 shows a well logging instrument disposed in one example of a deployment device coupled to a drill string disposed in a wellbore.

An example well logging system according to various aspects of the invention in which one or more well logging instruments is conveyed through a wellbore is shown schematically in FIG. 1. A drilling rig 24 or similar hoisting device suspends a pipe string 20 in a wellbore 18 drilled through subsurface rock formations 11. The pipe string 20 is generally assembled by threadedly coupling together end to end a plurality of individual segments ("joints") 22 of drill pipe or other threadedly connected pipe. To extend the axial length (depth) of the wellbore 18, hoisting equipment (not shown separately) on the rig 24 releases the pipe string 20 to cause some of its weight to be applied to a drill bit 14, which may be disposed at the bottom end of the pipe string 20. A top drive 26 or a functionally equivalent device (e.g., kelly, kelly bushing and rotary table) on the rig 24 may be used to rotate the pipe string 20, or an hydraulic motor (not shown in FIG. 1) disposed in the pipe string 20 may perform such rotation of the components below it in the pipe string 20. A pump 32 lifts drilling fluid 30 ("mud") from a storage tank or pit 28 and discharges the mud 30 under pressure through a standpipe and hose combination 34 into the top drive 26. The mud 30 travels under pressure through various rotary seals (not shown) in the top drive and then into the interior of the pipe string 20. The mud eventually is discharged through nozzles or courses (not shown) in the bit 14 so that the mud 30 cools and lubricates the bit 14, provides hydrostatic pressure to prevent entry of fluids from the formations 11 into the wellbore 18 and lifts drill cuttings to the surface for disposal.

In the example of FIG. 1, a well logging instrument or an assembly of a plurality of such instruments (referred to for convenience collectively hereinafter as "logging instruments") is shown generally at 10 disposed inside the pipe string 20 at a selected position typically above the drill bit 14, and generally disposed longitudinally completely inside the pipe string 20. In other examples, the pipe string 20 may exclude the drill bit 14 and have an open lower end. The logging instruments 10 may be retained in the selected position inside the pipe string 20 by a controllable latch 12 which will be described in more detail below. The term logging instruments is included to mean, without limitation any device for measuring a property of the formations 11, ambient conditions in the wellbore 18 (e.g., pressure, temperature, fluid density) and/or mechanical properties of the wellbore 18 and the interior of the pipe string (e.g., a caliper). The term logging instruments may also mean devices that are used to withdraw samples of the formations 11 or samples of fluid contained in the pore spaces thereof.

A purpose of the system shown in FIG. 1 is to enable use of the pipe string 20 to convey the logging instruments 10 beyond places (not shown separately) in the wellbore 18 where conveyance by other techniques, including by gravity at the end of a cable, by coiled tubing, or by being fixedly coupled at the end of the pipe string 20 may be undesirable, unsafe or impracticable. Those skilled in the art will be familiar with the conditions under which conveyance of logging instruments disposed inside drill pipe is desirable and effective and so these will not be described in detail herein. When using the system shown in FIG. 1, the logging instruments are latched in place within the pipe string 20 generally as shown, and the pipe string 20 is lowered into the wellbore 18. Once the pipe string 20 has been moved so that the logging instruments 10 are considered to be safely beyond any such adverse wellbore condition, it may then be desired to operate the logging instruments 10 to make measurements of properties of the formations 11 outside the wellbore 18 or to perform other operations as is consistent with the broadly applied term "logging instruments." To perform such operations, the latch 12 is released to enable the logging instruments 10 to extend through the bottom end of the pipe string 20, or through an opening in the drill bit 14, if particular types of drill bits are used on the pipe string 20 that enable such movement. See, for example, U.S. Pat. No. 6,269,891 issued to Runia or U.S. Pat. No. 5,244,050 issued to Estes for non-limiting examples of such drill bits.

Upon being extended through the end of the pipe string 20 by a selected length, the logging instruments 10 may be latched in such place in the pipe string 20 or otherwise restrained from further movement out of the bottom of the pipe string 20. The logging instruments may be operated in place, and/or the pipe string 20 may then be withdrawn from the wellbore 18 while sensors (e.g., see FIG. 1B) in the logging instruments 10 make measurements of selected parameters of the formations 11 outside the wellbore 18 and/or of the physical characteristics of the wellbore 18, such as its diameter. Details of examples by which the latch 12 is operated to enable extension of the logging instruments 10 beyond the end of the pipe string 20 is initiated will be further explained below with reference to FIGS. 1A and 1B.

In some examples, the latch 12 may be caused to operate to release the logging instruments 10 by application of suitable fluid pressure to the interior of the pipe string 20. Such pressure may be, for example, a selected absolute pressure value, or may be a coded sequence of increases and decreases in pressure. Such pressure may be applied by suitable operation of the pump 32, or by a supplemental pump (not shown) and/or by a bypass valve (not shown) in pressure communication with the pump 32. Examples of the latter two devices as may be used in some implementations are described in U.S. Pat. No. 4,856,595 issued to Upchurch and assigned to the assignee of the present invention. The fluid pressure to operate the latch may be measured by a sensor 36 that is in signal communication with a recording unit 42. The sensor 36 may be a pressure sensor, a flow sensor, a plurality of sensors, such as differential pressure sensors, or other types of sensors that may be used to measure changes in the fluid properties. For example, the sensor 36 may measure changes in the flow rate, such as a sequence in the flow rate, and decipher or otherwise determine a command signal based on these changes to the flow rate. The recording unit 42 can include equipment (not shown separately) for making a record with respect to time of measurements made by various sensors in the logging instruments 10, the depth of the pipe string 20 in the wellbore 18 and the pressure, among other parameters. Communication of signals from the sensor 36 to the recording unit 42 is shown as wireless, however such communication is not a limit on the scope of the invention.

In some examples, the pipe string 20 may be a so called "wired" pipe string and include therewith a signal communication channel such as a wire or cable (not shown) associated with each pipe joint 22 and a communication coupling (not shown) at the longitudinal ends of each pipe joint 22 to enable signal communication along the wired pipe string 20. Non-limiting examples of such wired pipe strings and associated communication devices are described in U.S. Patent Application Publication No. 2006/0225926 filed by Madhavan et al., the underlying patent application for which is assigned to the assignee of the present invention and U.S. Pat. No. 6,641,434 issued to Boyle et al. also assigned to the assignee of the present invention. When such "wired" pipe strings are used, the logging instruments 10 may include signal communication devices (explained below) to maintain signal communication using the communication channel (not shown) in the wired pipe string 20. Signal communication may also be maintained between the recording unit 42 and the channel (not shown) in the wired pipe string 20 by a transceiver 40 associated with the recording unit and a transceiver 38 associated with the top drive 26. Such transceivers 38, 40 enable free movement of the pipe string 20 while maintaining the above described signal communication.

Figure 1A:
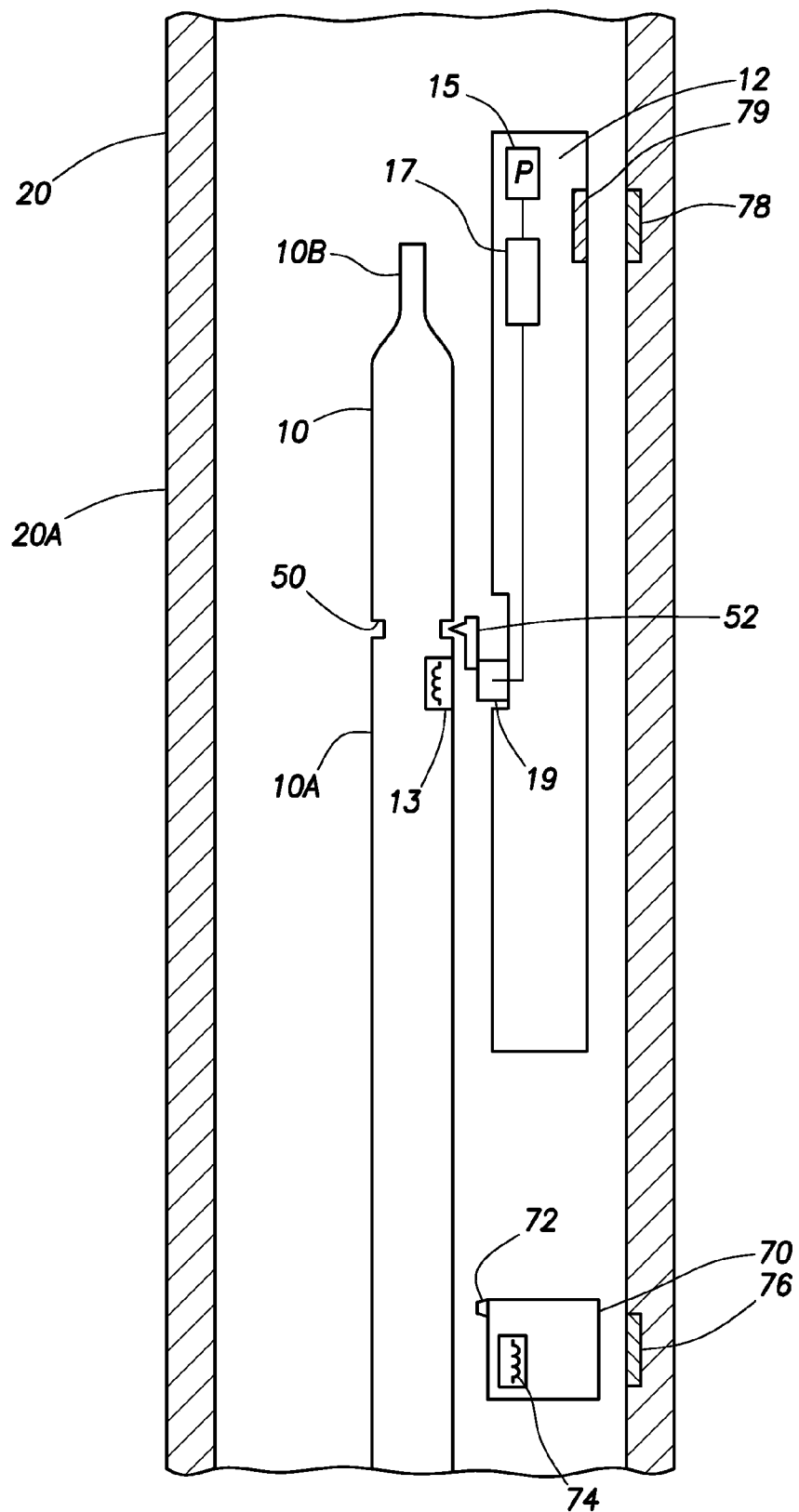
FIG. 1A shows the logging instrument latched in place inside the pipe string prior to deployment.

FIG. 1A shows a more detailed cross section of the logging instruments 10 locked in place inside the pipe string 20 by the latch 12 prior to deployment. The entire assembly of components may be disposed inside a housing 20A that may be configured from one or more joints of pipe (e.g., 22 in FIG. 1), which as will be further explained may in some examples be wired drill pipe. The logging instruments 10 may be generally enclosed in a pressure resistant housing 10A such as may be made from stainless steel, titanium or other high strength, corrosion resistant material. The housing 10A may include a retaining groove 50 or similar feature on its exterior surface into which a first retaining key 52 extends from the latch 12. The latch 12 may be fixedly disposed inside the pipe string 20 so that extension of the first retaining key 52 into the groove 50 will prevent longitudinal movement of the logging instruments 10 in the pipe string 20.

In the present example, the latch 12 may be configured to be operated by a control signal from the surface (e.g., the recording unit 42). One example control signal includes applying a particular pressure or coded sequence of pressure to the interior of the pipe string 20 as explained above with reference to FIG. 1. A pressure sensor 15 may be disposed proximate the latch 12 or can be associated therewith and can detect the fluid pressure inside the pipe string 20. Output of the pressure sensor 15 may be conducted to a controller 17 such as a microprocessor associated with the latch 12. The controller 17, upon determining from the measured pressure that a release command has been transmitted from the surface, will cause operation of an actuator 19. Operation of the actuator 19, several examples of which will be explained below with reference to FIGS. 2 through 6, causes the first retaining key 52 to move out of the retaining groove 50, or enables it to bend outwardly if, for example, the retaining key 52 is disposed on a spring metal structure. Movement of the retaining key 52 out of the groove enables the logging instruments 10 to move longitudinally downwardly through the interior of the pipe string 20. Longitudinal movement may be by gravity or may be performed by operating the pump (32 in FIG. 1) to move mud (30 in FIG. 1) through the interior of the pipe string 20.

Another example of operating the actuator 19, applicable to the case where the pipe string 20 is a wired pipe string as explained above, is to include a communication coupling 78 in the pipe string 20 proximate a selected position on the latch 12, and to provide a corresponding communication coupling 79 proximate thereto and associated with the latch 12. The communication coupling 78 in the pipe string 20 may be in signal communication with the communication channel (not shown) in the wired pipe string 20. Commands to operate the latch 12 may be transmitted over the wired pipe string, through the communication couplings 78, 79 and to the controller 17 to operate the actuator 19 in a manner similar to the pressure-controlled actuation described above.

In the present example, a second retaining key 72 may be disposed in a suitable position inside the pipe string 20 longitudinally displaced from the latch 12 so that movement of the logging instruments 10 is limited. Typically, such limit will provide that sensor-containing portions (not shown in FIG. 1A) of the logging instruments 10 extend into the wellbore (18 in FIG. 1) below the bottom of the pipe string 20. A possible alternative to using the second retaining key 72, can be to provide a diameter of an opening in the lower end of the pipe string 20 (or drill bit 14 in FIG. 1) and a corresponding outer diameter of portion of the logging instrument housing 10A selected such that only a portion of the housing 10A may pass therethrough, causing the remaining portion of the housing 10A to be retained inside the pipe string 20.

In examples wherein the pipe string 20 is a wired pipe string as explained with reference to FIG. 1, the second retaining key 72 may be associated with a data communication link 70. The data communication link 70 may include a communication coupling 74 positioned in the data communication link 70 so that when the logging instruments 10 are latched in place by the second retaining key 72, a communication link 13 disposed in a suitable position inside the logging instrument housing 10A will be positioned longitudinally proximate the communication coupling 74 so that the logging instrument's communication link 13 can transfer signals between the logging instruments 10 and the communication coupling 74. The communication link 70 can be configured to communicate signals between the communication link 70 and a communication device 76 disposed in the wired pipe string 20 similar to those described above (i.e., 78, 79) with respect to the latch 12. Non-limiting examples of electromagnetic communication devices for transferring signals between logging instruments and ancillary devices such as the communication link 70 are shown in U.S. Pat. No. 5,521,592 issued to Veneruso and assigned to the assignee of the present invention.

The second retaining key 72 may be configured, for example, by suitable tapering, to enable free movement of the logging instruments 10 in an upward direction, back inside the pipe string 20, while preventing further downward movement. As may be necessary during operations, the logging instruments 10 may be withdrawn longitudinally fully back inside the pipe string 20, for example, by reverse pumping of the mud (30 in FIG. 1) or by attaching a suitable retrieval device (not shown in FIG. 1A) to a "fishing neck" 10B or similar retrieval feature on the top of the logging instrument housing 10A.

The logging instruments 10 may also be fully withdrawn from the pipe string 20 in such configurations. One non-limiting example of a technique for withdrawing the logging instruments is to insert a winch deployed "slickline" (not shown) with a suitable latch (not shown) to couple to the fishing neck 10B to retrieve the logging instruments 10.

Figure 1B:
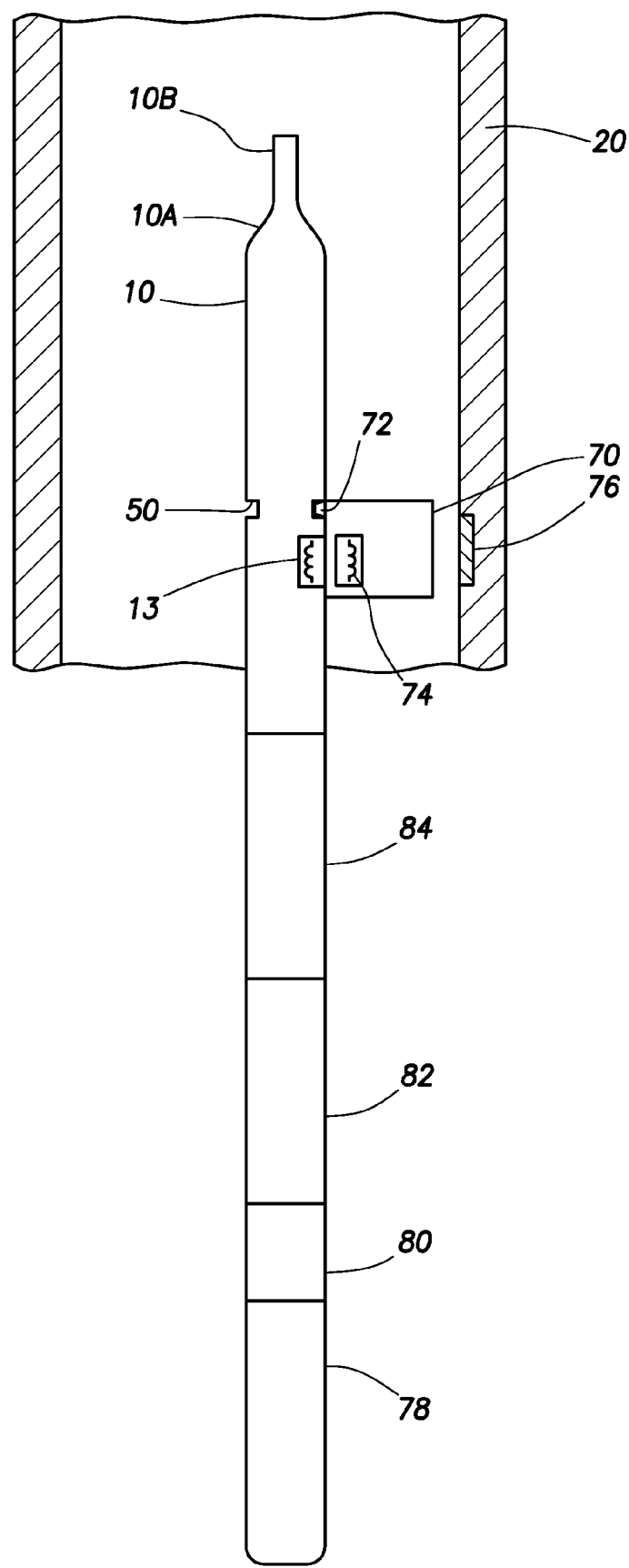
FIG. 1B shows the logging instrument deployed partially outside the pipe string.

FIG. 1B shows the logging instruments 10 in a deployed position extending at least partially outwardly below the bottom of the pipe string 20. As explained with reference to FIG. 1, some pipe strings may include a drill bit (e.g., 14 in FIG. 1) at the lower end thereof configured to enable movement of the logging instruments 10 therethrough, although the example in FIG. 1B does not show such a drill bit. After release of the first retaining key (19 in FIG. 1A) in the latch (12 in FIG. 1A), the logging instruments 10 may move downwardly through the pipe string 20 for example, by gravity or by pumping mud (30 in FIG. 1) until the second retaining key 72 seats in the groove 50, thus preventing further downward movement of the logging instruments 10. In wired pipe string configurations, such as shown in FIG. 1B, signal communication to the recording unit (42 in FIG. 1) may be performed using the electromagnetic coupling components 13, 74, 76 described above to transfer signals to and from the communication channel (not shown separately) in the wired pipe string 20. In pipe strings not using or having a communication channel, signals detected by various sensors in the logging instruments 10 may be recorded in a data storage device (not shown separately) in the logging instruments 10.

Examples of logging instruments that may be used include, without limitation, electromagnetic induction or galvanic resistivity measurement devices 78, natural gamma spectroscopy devices 80, gamma-gamma density/photoelectric effect measurement devices 82 and neutron hydrogen index measurement devices 84. Other well logging instruments will occur to those skilled in the art that may be used in accordance with the present invention and the examples shown in FIG. 1B are not intended to limit the scope of the invention.

Figure 2:
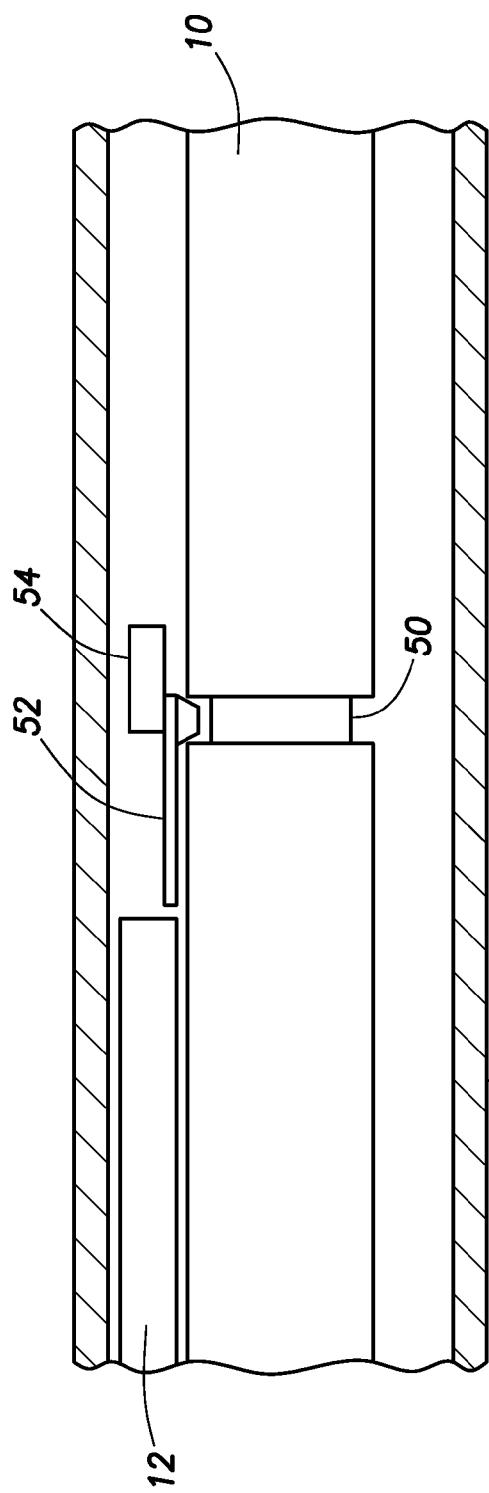
FIGS. 2 through 6 show various examples of latch release actuators.

FIGS. 2 through 6 show various examples of devices to release the first retaining key (52 in FIG. 1A). The general principle of all the release mechanisms in FIGS. 2 through 6, and generally with reference to FIG. 2, is the use of a release pawl 54, that prior to release of the logging instruments 10 is disposed over the end of the first release key 52 so that it remains depressed in the groove 50, thus locking the logging instruments 10 in position inside the pipe string 20. When the release pawl 54 is moved longitudinally as indicated by the arrow in FIG. 2 so that it no longer covers the first retaining key 52, the first retaining key 52 is free to move laterally outwardly from the groove 50.

Figure 3:
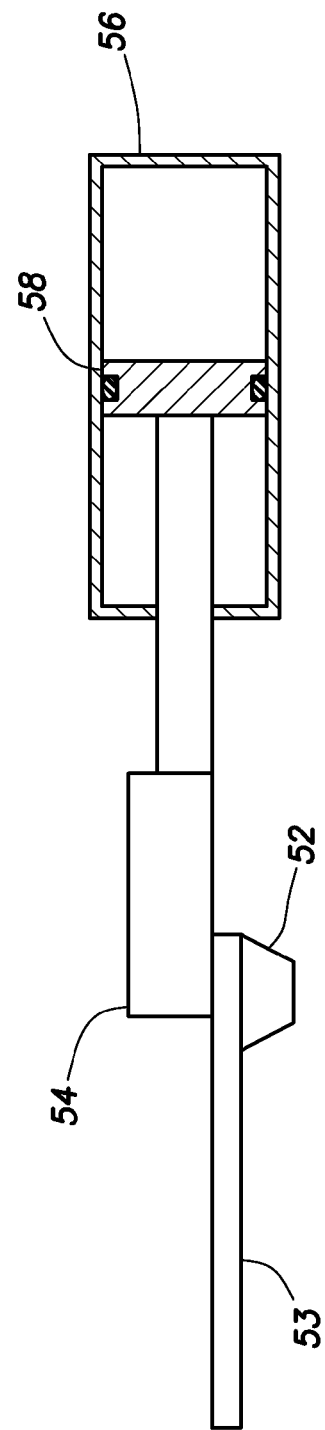

Referring to FIG. 3, one way to enable the first retaining key 52 to self-release from the groove is to mount it to the latch 12 using a spring steel connector bar 53. The same connector bar 53 may be used in all the examples to be explained with reference to FIGS. 3 through 6. The example shown in FIG. 3 includes an hydraulic cylinder 56 with a piston 58 disposed therein. Suitable components (not shown) in the latch (12 in FIG. 2) may cause the piston 58 to retract the release pawl 54 upon receipt of a release command as explained above.

Figure 4:
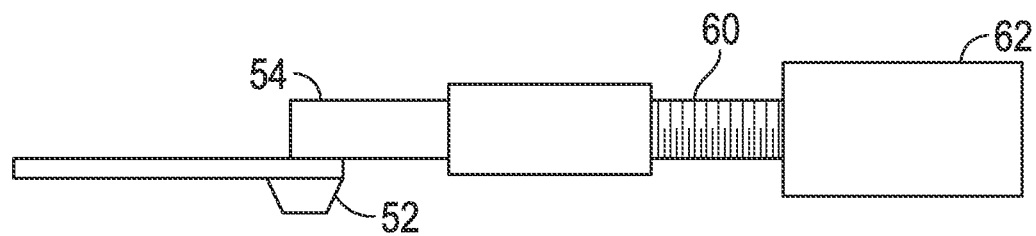

An example shown in FIG. 4 includes a motor 62 and worm gear 60 operatively coupled to the release pawl 54. The motor 62 can be operated upon receipt of the release command in the latch (12 in FIG. 2) to rotate the screw 60 and thus retract the release pawl 54.

Figure 5:
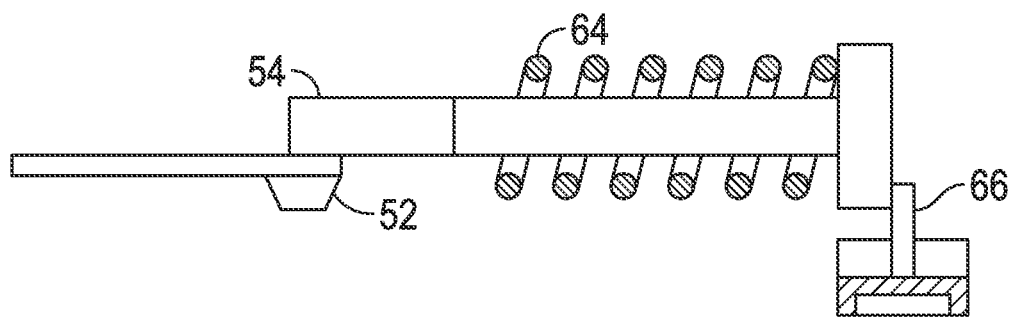

Another example is shown in FIG. 5, in which the release pawl 54 is coupled to a spring 64. The spring 64 is held in place by a retainer 66 which may be an electrically operated solenoid or piston/cylinder (e.g., as shown in FIG. 3). Operation of the retainer 66 causes the spring to pull the release pawl 54 to enable release of the first retaining key 52.

Figure 6:
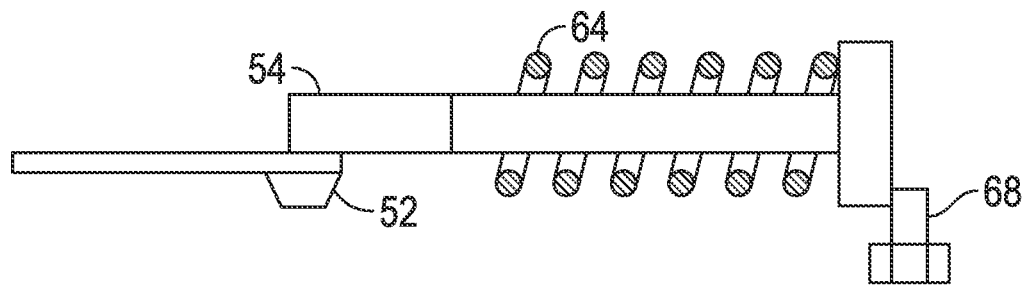

FIG. 6 shows a spring operated version of the release pawl 54 actuator in which the spring 64 is released by using, for example, an explosive squib 68. Other devices for actuating the release pawl will occur to those of ordinary skill in the art.

Figure 7:
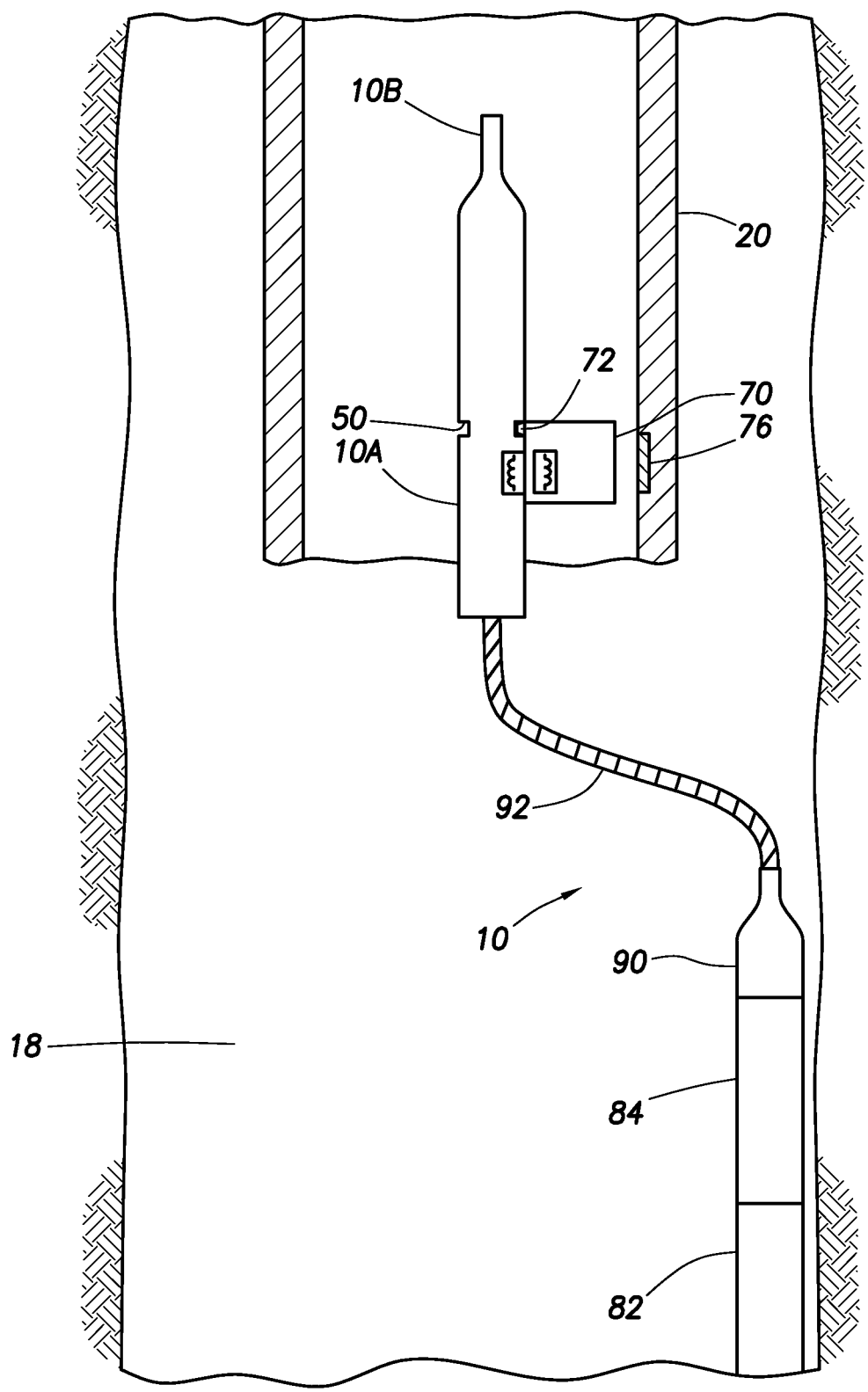
FIG. 7 shows another example of logging instrument deployed outside the pipe string.

In another example shown in FIG. 7, the well logging instruments 10 may be flexibly deployed through the end of the pipe string 20 (with or without a special drill bit 14 as described above) in order that certain sensors are enabled to contact the wall of the wellbore 18. The housing 10A is shown retained in place by the second retaining key 72 as in the example shown in FIG. 1B. In the present example, signal communication may be wired as shown and/or sensor signals may be stored in the logging instruments 10 as explained above. The housing 10A may be coupled at its lower end to one end of a segment 92 of armored electrical cable of any type ordinarily used to covey wireline instruments in a wellbore. The segment 92 may be coupled at its other end to a tool head 90 of any type well known in the art for coupling electrical cable to well logging instruments. The remainder of the sensors and other devices in the logging instruments (84 and 82 shown in FIG. 7) may be coupled below the tool head 90. As can be observed in FIG. 7, the cable segment 92 enables the logging instruments 10 to be substantially laterally displaced from the housing 10A and the center line of the pipe string 20. The logging instruments 10 may be operated substantially as explained with reference to FIG. 1C. Should it be desirable or necessary to return the logging instruments 10 fully to the interior of the pipe string 20, a suitable device may be coupled to the fishing neck 10B as in the previous example, and the logging instruments 10 withdrawn back inside the pipe string 20. While a cable segment 92 is shown coupling the housing 10A to the various devices below, it will be readily appreciated that other flexible members known in the art can perform the equivalent function of enabling the logging instruments 10 to laterally deflect from the pipe string 20. Non-limiting examples include flex joints, knuckles, universal joints and similar devices. The example shown in FIG. 7, as well as the foregoing additional examples, may have advantages for use with sensors that operate better when in contact with the wellbore wall, for example, density and neutron hydrogen index sensors.

A well logging tool conveyance system according to the various aspects of the invention may be provide more reliable, safer release of the well logging instruments into open wellbore below a pipe string than devices known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A well logging instrument deployment device, comprising:
   a conveyance device configured to be coupled to a pipe string;
   an actuator configured to release the well logging instrument from within the pipe string so that the logging instrument extends at least partially out from an end of the pipe string;

a signal detector operatively coupled to the actuator, the detector configured to detect a command signal for operating the actuator;

a latch disposed on or within the conveyance device and configured to retain the well logging instrument in a first longitudinal position; and a device for terminating longitudinal motion of the well logging instrument at a second longitudinal position when a selected portion of the logging instrument is exposed below an end of the pipe string, wherein the device for terminating longitudinal motion comprises a tapered retaining key configured to cooperatively engage a groove in an exterior of the well logging instrument.

2. The device of claim 1 wherein the actuator comprises a device for moving a release pawl away from a retaining key, the retaining key disposed in a corresponding retaining groove in an exterior of the well logging instrument.

3. The device of claim 2 wherein the device for moving the release pawl comprises at least one of an explosive squib, a motor and gear assembly, an electrically operated solenoid and an hydraulic cylinder and piston.

4. The device of claim 1 wherein the signal detector comprises a flow sensor or a pressure sensor.

5. The device of claim 1 wherein the command signal comprises a coded sequence of pressures.

6. The device of claim 1 wherein the signal detector comprises a communication coupling configured to detect signals from a communication channel in a wired pipe string.

7. The device of claim 1 further comprising a communication link associated with the well logging instrument and configured to detect signals from and transmit signals to a communication channel in a wired pipe string.

8. The device of claim 1 wherein the device for terminating longitudinal motion enables longitudinal movement of the logging instrument back into the pipe string.

9. The device of claim 1 wherein the well logging instrument comprises a flexible segment below a position of the latch, whereby the well logging instrument is laterally displaceable from the pipe string when at least partially disposed beyond the end thereof.

10. A method for well logging, comprising:

coupling a well logging instrument into a conveyance device;

coupling the conveyance device to a pipe string;

inserting the pipe string into a wellbore;

transmitting a signal to the conveyance device to release the well logging instrument from a latch disposed on or within the conveyance device, wherein the latch maintains the well logging instrument in a first longitudinal position; and moving the well logging instrument longitudinally inside the pipe string, wherein a device for terminating longitudinal motion of the well logging instrument engages a groove in an exterior of the well logging instrument with a tapered retaining key when a selected portion of the logging instrument is exposed below an end of the pipe string.

11. The method of claim 10 wherein the transmitting a signal comprises changing a pressure of a fluid in the pipe string to cause release of a latch holding the instrument inside the deployment device.

12. The method of of claim 11 wherein the changing pressure comprises a coded sequence of pressure changes.

13. The method of claim 10 further comprising retaining the logging instrument in position at least partially beyond the end of the pipe string.

14. The method of claim 13 further comprising operating at least one sensor associated with the well logging instrument and withdrawing the pipe string from the wellbore.

15. The method of claim 14 further comprising at least one of storing measurements from the at least one sensor proximate the well logging instrument and transmitting the measurements over a wired pipe string.

16. The method of claim 10 wherein the releasing comprises operating at least one of an explosive squib, a motor and gear assembly, an electrically operated solenoid and an hydraulic cylinder and piston to release a latch.

\* \* \* \* \*